Oct. 20, 1925.
H. L. THOMPSON
LAWN MOWER
Filed Feb. 2, 1922
1,557,902
3 Sheets-Sheet 3
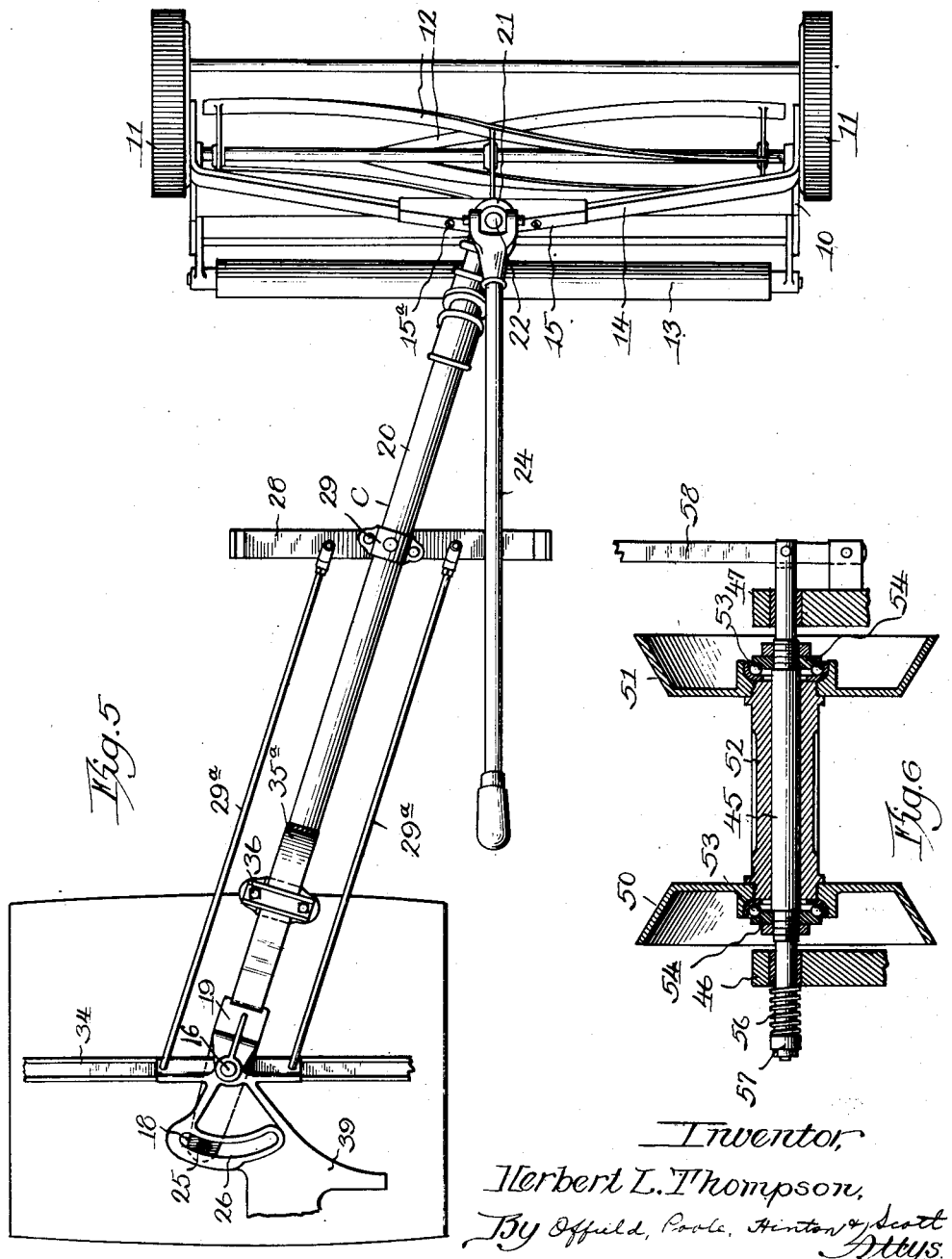
Inventor,
Herbert L. Thompson,
By Offield, Poole, Hinton & Scott
Attys.

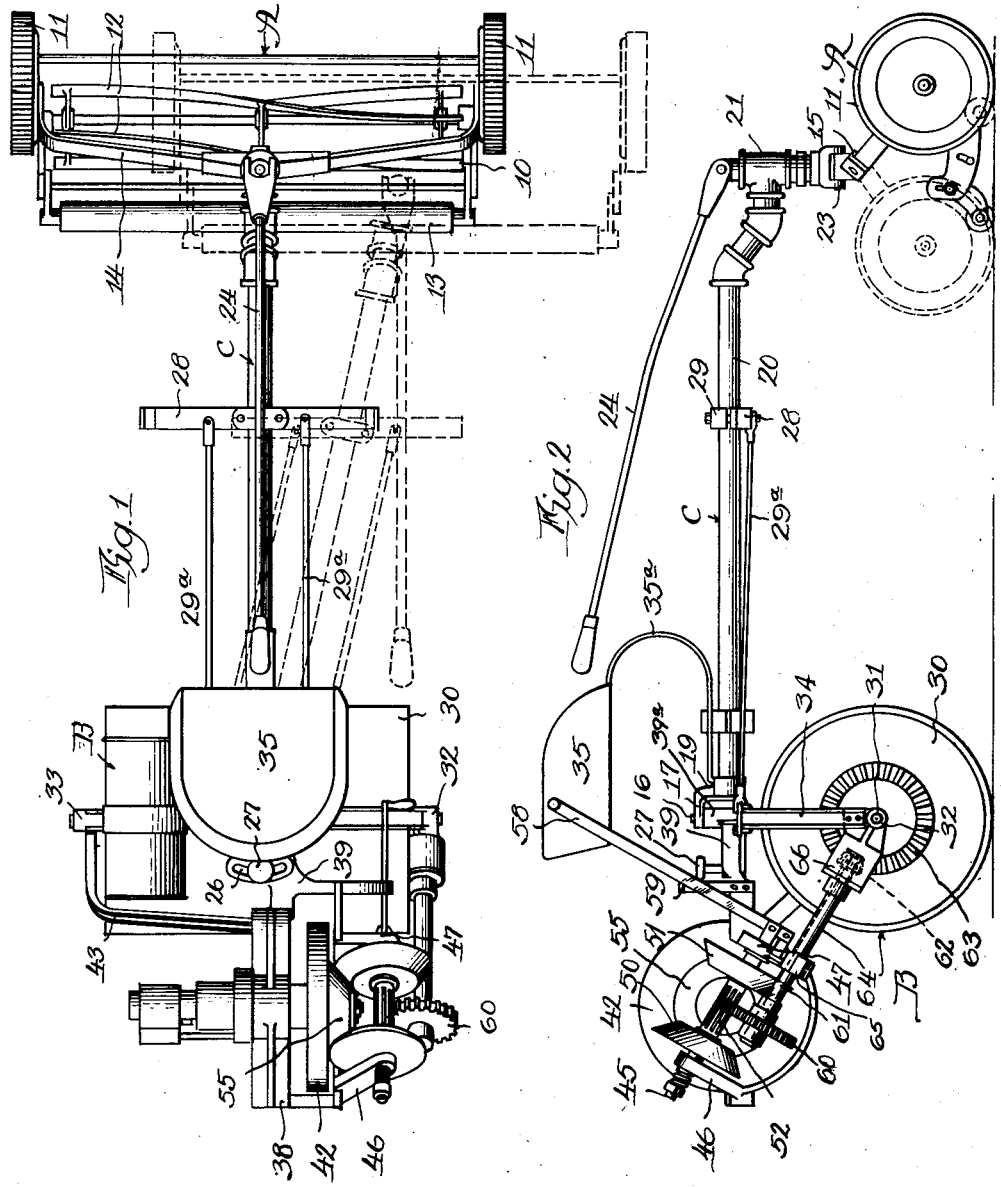

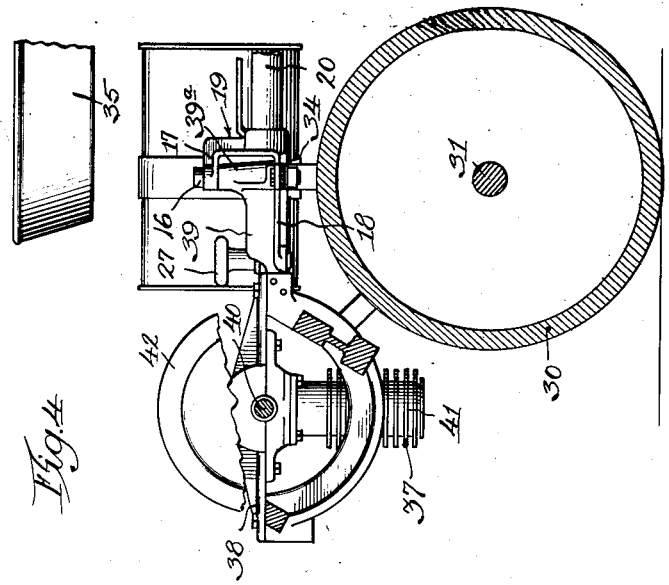
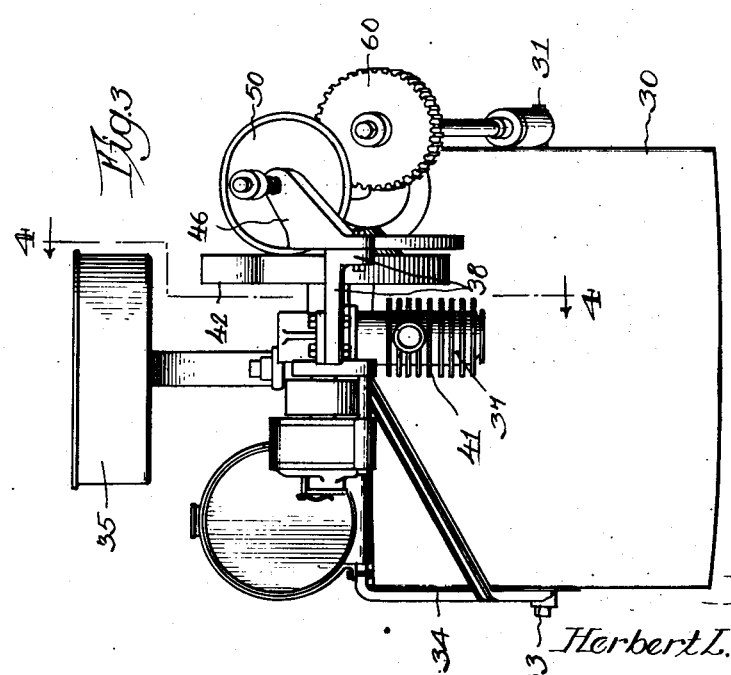

Patented Oct. 20, 1925.

1,557,902

UNITED STATES PATENT OFFICE.

HERBERT L. THOMPSON, OF ELGIN, ILLINOIS.

LAWN MOWER.

Application filed February 2, 1922. Serial No. 533,506.

*To all whom it may concern:*

Be it known that I, HERBERT L. THOMPSON, a citizen of the United States, and a resident of Elgin, in the county of Kane and State of Illinois, have invented certain new and useful Improvements in Lawn Mowers, of which the following is a specification.

This invention relates to improvements in power lawn mowers and has for its principal object to provide a machine of the class described, which is simple in construction and operation, capable of being readily controlled in its movements, and adjustable to various operating conditions. A further object is to provide a power element capable of being combined with a lawn mowing element of the ordinary hand operated type to form a power operated machine.

The invention consists in the construction, combination and arrangement of parts, as will more fully appear from the following description, and specifically pointed out in the appended claims, reference being had to the accompanying drawings, in which:

Fig. 1 is a plan view of a power mower, constructed in accordance with my invention, Fig. 2 is a side view of the mower, Fig. 3 is a rear view of the mower drawn to a somewhat larger scale than Figs. 1 and 2, Fig. 4 is a view in vertical section taken on line 4—4 of Fig. 3, Fig. 5 is an enlarged detailed view of the main supporting member, showing the steering device mechanism for swinging the mowing element into and out of alignment with the power element, and Fig. 6 is a detailed view of a portion of the transmission mechanism.

Referring now to details of construction shown in the drawings, which illustrates one form in which my invention may be embodied, the machine comprises a mowing element A and a power element B, connected together by main beam C. The mowing element is preferably of the ordinary hand operated type used for cutting lawns, comprising a frame 10, provided with a pair of traction wheels 11, 11 operatively connected with a revolving cutter having a plurality of blades 12, 12. The frame is provided with a trailing roller 13 of the usual type. A cross member 14 is connected to opposite sides of the frame and extends upwardly and rearwardly therefrom. This cross member is usually provided with a handle, but when used with my device, the handle is removed, and a clamping member 15 associated with the beam C is connected to this member by suitable means such as bolts 15$^a$, 15$^a$.

The mowing element A is positioned in advance of the power element B and is spaced therefrom by means of the main beam C. This beam preferably comprises a rigid bar 20 made of tubing or the like, and having at its forward end a sleeve 21, in which is carried a vertically disposed steering post 22. The lower end of said steering post is connected with the mowing element A by clamping member 15, as already described. A steering handle 24 is pivotally connected to the upper end of the steering post and extends rearwardly to afford means of steering the machine. A pivotal connection 23 is also provided between steering post 22 and clamping member 15, so as to permit the mowing element A to rock in a transverse plane, thus affording relative flexibility of the power element and the mowing element when traversing uneven ground.

The power element B is supported on an elongated traction roller 30, having its largest diameter at its center, and tapering toward its ends, somewhat in the shape of an ordinary barrel. This shape is preferable in traversing uneven ground, and also permits the machine to be readily turned without tending to injure the turf. The roller may be of any suitable construction and is provided with an axially disposed shaft 31, journaled in suitable bearings 32 and 33 on opposite ends thereof. A supporting member 34, such as a channel bar, extends over the roller and is connected at its ends to journal bearings 32 and 33. A frame member 39 is secured to the supporting member 34 above the roller 30.

The main beam C is pivotally connected to the power element B by means of a vertically disposed pin 16 mounted on a spindle 39$^a$ integral with frame member 39, and having its upper and lower ends pivotally connected with upper and lower arms 17 and 18, respectively, of a yoke 19 carried on the rear end of main beam C. The lower arm 18 of said yoke extends rearwardly under the frame member 39, and has a vertically disposed bolt 25 extending upwardly through an arcuate slot 26 formed in said frame member. A nut 27, preferably knurled for manual operation, is threaded on said bolt and adapted to engage and clamp the frame member when it is desired to hold the beam in any desired angular position with respect to the power element. When the nut 27 is loosened, the beam C is free to swing through a limited arc, so as to permit the mowing element A to be moved laterally into various positions, either in normal alignment with the power element B or offset therefrom, as indicated in Figs. 1 and 5.

Means whereby the operator may control the movement of beam C comprise a lever or cross-member 28, pivotally connected intermediate its ends to a clamp 29 or its equivalent, secured to the bar 20 of main beam C. A pair of links 29ª, 29ª extend rearwardly from each arm of cross member 28, and each of said links is pivotally connected to the frame member 39. An operator's seat 35 is mounted adjacent the pivotal connection of beam C and power element B and faces toward the mowing element A. In the preferred construction illustrated, the seat 35 is supported on beam C by means of a spring 35ª secured to the rod 20 by a clamp 36 adjacent the rear end of said rod. The arrangement is such that the operator, mounted in the seat 35, may extend his feet forwardly to rest on the two arms of cross member 28, and by applying pressure to one or the other of said arms, the beam may be swung laterally as desired, to control the position of the mowing element A with respect to the power element B. It will also be noted, that the steering handle 24, already described, extends rearwardly from the mowing element in position to be manually controlled by the operator, for guiding the device.

A motor 37 is mounted on a rearwardly extending bracket 38 connected to the frame member 39, as shown in Figs. 3 and 4. The motor and operator's seat are placed on opposite sides of the axis of the roller, so that the weights of the motor and the operator tend to counterbalance each other, and the combined weight of both is practically all supported by the roller. By means of this arrangement very little additional weight is carried by the mowing element A.

The motor may be of any type desired, as for instance, an internal combustion motor, having a main shaft 40, cylinder 41 and flywheel 42. A lateral brace 43 connected to journal bearing 33 affords additional rigidity to the bracket 38.

The power transmission mechanism is preferably of the friction type, and comprises an endwise movable shaft 45 arranged at a right angle to the motor shaft 40 and adjacent the outer face of flywheel 42. The rear end of the shaft 45 has bearing in a bracket 46 connected to the bracket 38 and extending around the rear of said flywheel. The forward end of said shaft has bearing in a bracket 47, preferably integral with the frame member 39. A pair of oppositely disposed friction cones 50 and 51 are rotatably mounted on said shaft and are connected together by an intermediate pinion 52, rotatable therewith. Ball bearings 53, 53 afford free rotation of said cones and intermediate pinion 52 as a unit on said shaft, but the outer raceways 54, 54 of said bearings are fixed on said shaft so that the cones and pinion are movable longitudinally therewith. A driving cone 55 is concentrically mounted on the flywheel and is adapted to have driving engagement with one or the other of the cones 50 and 51, as desired. Means for shifting the cones comprise a lever 58, connected with the forward end of shaft 45, and manually operable to move cone 50 or cone 51 into driving engagement with cone 55, thereby reversing the direction of rotation of the pinion 52, as desired. When driving forward, lever 58 is normally engaged behind a stop 59 on the frame 39, to hold cone 50 in operative engagement with cone 55. A compression spring 56 is mounted at the outer end of shaft 45 and interposed between bracket 46 and a nut 57. When lever 58 is released from stop 59, said spring tends to move the shaft rearwardly to disengage cones 50 and 55. In order to reverse the machine, lever 58 is pushed rearwardly to bring cone 51 into operative engagement with the driving cone 55. The driving connection between pinion 52 and the roller comprises a gear 60, shaft 61 and bevel pinion 62, the latter meshed with a bevel gear 63 carried on the roller 30. The shaft 61 is preferably enclosed in a tube 64 which is suitably clamped in a bracket 65, and affords bearing for said shaft and gear 60. The lower end of tube 64 is connected with a housing 66, for said bevel pinion, and said housing in turn is connected to the journal bearing 32. The arrangement is such that housing 66, tube 64 and bracket 65 afford support for one side of the frame member 39.

The use and operation of the machine above described is as follows:

When in operation, the mowing element precedes the power element. Under ordinary conditions the two elements are maintained in substantial alignment with the nut 27, screwed down on frame member 39 to hold the beam C substantially at a right angle to the roller 30, so that it is only necessary to guide the machine by the steering handle 24. Under some conditions, however, it is desirable to offset, or shift, the mowing element sideways one way or the other with respect to the power element, as for instance, when cutting along a hedge, sidewalk, or the like. This may be done by loosening the nut 27 so that the beam C may be swung around into the desired position by means of the foot lever 28. If the machine is to operate for a considerable distance in a given offset position, the nut 27 may again be tightened to hold the beam in the position desired. Or, if it is desired to shift the mower laterally into varying positions, as for instance, when trimming along an irregular path, such as a curved flower bed margin, the beam C is permitted to swing freely. The operator may then control the position of the mowing element at all times with his feet, by operating the cross member 28, and at the same time he guides the forward movement of the machine by steering handle 24. It will thus be seen, that the machine is easily controlled and steered so that it may be used under varying conditions.

When it is desired to transfer the machine from place to place over rough ground without injury to the mower, the mowing element is rotated through 180 degrees about its vertical axis and steering handle 24 is brought forward to its normal position as indicated in dotted lines in Fig. 2. When the mowing element is moved backwardly in this position, the cutting blades are protected from injury when passing over rough ground. Furthermore, ordinary hand-operated machines of the type illustrated are usually equipped with ratchet mechanism which renders the cutters inoperative when the machine is moved backward in this manner. The steering handle 24 is swung over the steering post into steering position as before, and the machine may thus be driven forwardly under power over rough ground for long distances.

Although I have shown as a preferred form a mowing element of the ordinary hand operated type which may be readily converted into a power actuated machine, it will be understood that other types of mowing devices may be substituted therefor, if desired, and I do not wish to be understood as limiting myself to the particular type of mowing device described, nor to details of construction of the power element and associated parts, excepting as specifically limited in the following claims.

Having described my invention, I claim:—

1. In a device of the character described, the combination of a mowing element, a power element, a beam having pivotal connection at each end with said elements, means for controlling the position of said beam with respect to said power element and independently operative means for moving said mowing element about a vertical axis with respect to said beam.

2. In a device of the character described, a mowing element, a power element, a beam having pivotal connection with both members, controlling means for pivotally moving said beam with respect to said power element, comprising a foot operated lever, and other controlling means for pivotally moving said mowing element with respect to said beam, comprising a steering handle connected with said mowing element.

3. In a device of the character described, a mowing element, a power element, a beam having pivotal connection with both members, controlling means intermediate said members for pivotally moving said beam with respect to said power element and other controlling means for pivotally moving said mowing element with respect to said beam, comprising a steering handle operatively connected with said mowing element and extending rearwardly to a position adjacent said first named controlling means.

4. In a device of the character described, a mowing element, a power element, a beam having pivotal connection with both members, controlling means for pivotally moving said beam with respect to said power element, comprising a cross member pivotally connected intermediate its ends to said beam and operatively connected to said power element, and other controlling means for pivotally moving said mowing element with respect to said beam.

5. In a device of the character described, the combination of a mowing element, a power element, a beam having free pivotal connection with said elements, foot operated means for controlling the swinging movement of said beam with respect to said power element and means for controlling the turning of said mowing element with respect to said beam, said controlling means being operative independent of each other.

6. In a device of the character described, the combination of a mowing element, a power element comprising a traction roller, a beam pivotally connected at its ends with said mowing and power elements, means for controlling the bodily movement of said mowing element relative to the path of said power element, and means for steering said mowing element independently of its position relative to the path of said power element.

7. In a device of the character described, the combination of a mowing element, a power element comprising a frame, a traction roller, a motor for driving said roller, a beam extending between said mowing element and said frame and pivotally connected to each, means mounted on said connecting member and operative from said power element for controlling the relative positions of said mowing element with respect to the path of said power element and a steering handle connected with said mowing element at the point of pivotal connection between the same and said connecting member.

8. A power attachment for hand operated mowing devices, comprising a traction roller, a frame, a motor supported by said frame and operatively connected with said roller, a beam extending between said frame and said mowing device, and having pivotal connection at each end therewith, means for controlling the bodily movement of said mowing device, and steering means for controlling the pivotal movement of said mowing device about its point of pivotal connection with said beam.

9. A power attachment for hand operated mowing devices, comprising a traction roller, a frame, a motor operatively connected to and supported by said roller, means extending forwardly from said frame and connected to said mowing device whereby the latter is spaced from and normally in alignment with said roller, steering means associated with said connecting means affording pivotal movement of the mowing device in a horizontal plane, and steering means permitting pivotal movement of said mowing device about its point of pivotal connection with said connecting means.

10. A power driven mowing device comprising a traction roller, a frame, a motor supported by said frame and having driving connection with said roller, a beam pivotally connected with said frame, a wheeled mowing element mounted at the free end of said beam to swing about a vertical axis through the medium of a steering post journalled in said beam and a steering handle connected with said steering post, and a lever pivotally mounted on said beam and connected with said frame for shifting said mowing element laterally in respect to the path of said traction roller.

11. A power driven mowing device comprising a frame, a traction roller, journalled in said frame, a motor operatively connected to said roller, a beam pivotally connected to said frame, a mowing element carried at the free end of said beam through the medium of a post journalled in said beam, a steering handle connected with said post, and foot operated means for shifting said mowing element laterally with respect to the path of said traction roller.

12. A power attachment for hand operated mowing devices, comprising a frame, a traction roller journalled in said frame, a motor supported by said frame and having driving connection with said roller, a beam pivotally connected at one end to said frame and journalled at its other end to a vertical steering post, a steering handle connected with said post and a lever pivotally mounted on said beam and connected with said frame through a medium of links extending parallel with said beam.

In witness whereof, I hereunto subscribe my name this 31st day of January, A. D. 1922.

HERBERT L. THOMPSON.